(12) United States Patent
Martin Gonzalez (10) Patent No.: US 7,170,025 B2
(45) Date of Patent: Jan. 30, 2007

(54) WELDING DEVICE

(75) Inventor: Ignacio Martin Gonzalez, Barcelona (ES)

(73) Assignee: Ocon Industrielle Konzepte, S.L., Barcelona (ES)

( * ) Notice: Subject to any disclaimer, the term of this patent is extended or adjusted under 35 U.S.C. 154(b) by 79 days.

(21) Appl. No.: 10/533,572

(22) PCT Filed: Oct. 29, 2003

(86) PCT No.: PCT/ES03/00555

§ 371 (c)(1),
(2), (4) Date: May 3, 2005

(87) PCT Pub. No.: WO2004/041472

PCT Pub. Date: May 21, 2004

(65) Prior Publication Data

US 2005/0284848 A1 Dec. 29, 2005

(30) Foreign Application Priority Data

Nov. 4, 2002 (ES) ................. 200202521

(51) Int. Cl.
*B23K 11/14* (2006.01)

(52) U.S. Cl. .................... 219/86.25; 219/93

(58) Field of Classification Search ............ 219/86.25, 219/93

See application file for complete search history.

(56) References Cited

U.S. PATENT DOCUMENTS

| 3,487,190 A | | 12/1969 | Glorioso et al. |
| 4,789,768 A | | 12/1988 | Tobita et al. |
| 4,831,228 A | * | 5/1989 | Schumacher ............. 219/86.22 |
| 6,037,558 A | * | 3/2000 | Geiermann et al. ...... 219/86.33 |
| 6,420,671 B1 | * | 7/2002 | Tsujimoto et al. ............ 219/79 |

* cited by examiner

*Primary Examiner*—Len Tran
(74) *Attorney, Agent, or Firm*—Pearl Cohen Zedek Latzer, LLP (57) ABSTRACT

IMPROVED RESISTANCE WELDING DEVICE that includes a mobile electrode in a support assisted by a spring, gas cylinder or expansion element, allowing its movement on being compressed so that the time lapse for the welding is sufficiently long to be effective, without altering the movement cycle of the press into which it is installed. The support has one or several columns, the electrode being supported sliding along one and with a rod housed on the inside of a positioning device, also axially movable, into which the small parts to be welded are received through a conduit. The positioning device, made from an insulated material, preferably ceramic, has some fixing clamps for said part until the welding is made pushed by the electrode rod through a lower window.

14 Claims, 7 Drawing Sheets

WELDING DEVICE

PRIOR APPLICATION DATA

The present application is a national phase application of International Application PCT/ES2003/000555, entitled "IMPROVED RESISTANCE WELDING DEVICE" filed on Oct. 29, 2003, which in turn claims priority from Spanish application P200202521, filed on Nov. 4, 2002 each of which are incorporated by reference in their entirety.

FIELD OF THE INVENTION

The present invention is directed to devices and method fox welding by resistance for welding, for example, small metallic parts and similar objects.

BACKGROUND TO THE INVENTION

The welding of small metal parts by resistance is used in many different industries. It is applicable for the surface joining of parts and in the welding of plate-like elements to be bonded together.

The classical welding operation consists of placing two parts between two electrodes applying pressure with a specific force at the moment of passing a defined electrical current for a specific time between the two electrodes. The considerable resistance that exists between the surfaces in contact with the two parts and the high current that passes produces a high degree of heat that melts the surrounding material, thus making the weld.

In many cases two parts of differing sizes are welded, such as a nut onto the surface of a sheet of a certain size. The large part is usually positioned below and the small one is loaded by hand, by means of shuttles or pistons, onto the large part prior to applying of the pressure with the electrodes to both parts and welding.

In this method of welding the time parameters for the circulation of the electrical current and the pressures exercised by the electrodes onto the parts to be welded are important.

In turn in the case of wanting to introduce a welding step in a progressive machine press or in a transfer station, this must be carried out at the end of the process and not in an intermediate position, as would be the most logical. This is due to the fact that during the pressing cycle a pair of electrodes facing each other is not in a position to be able to carry out the resistance for the time necessary with the correct pressure. This problem is commonly solved by means of fixing the parts to be joined by means of a rivet or something similar. In effect the riveting operation is adapted to the rising and falling cycle of the dies in a progressive press; however a rivet has low resistance to the traction and zero resistance to the torsion.

SUMMARY OF THE INVENTION

The object of the present invention is an improved device for welding by resistance that comprises significant innovations and advantages compared to the present fixtures and devices for resistance welding of small metallic parts and similar objects.

More specifically the new invention refers to a fixture that has an electrode fox the welding of small parts and similar objects in transfer machines or rotating presses amongst other applications. The device is made up of a movable electrode in a support assisted by a gas cylinder, spring or compression element, allowing the time lapse of the weld to be sufficiently longs so that it is effective, without altering the movement cycle of the press in which it is installed. This device is held in place by a fast acting clamp and works in coordination with a conventional electrode arranged in the lower die or matrix. The device can also be used in multi-use clamps of robots and other machines.

DESCRIPTION OF THE INVENTION

The improved device for welding by resistance that is the purpose of this invention is characterised in that it includes a two part electrode assembly that form a clamp and allow it to work as an intermediary welding step in a progressive press machine or transfer stamping machine or automated drawing. However, the use of said device in the clamps of robots and other mechanisms suitable for its use is not dismissed.

The device mainly seeks to obtain two advantages, consistent with the obtaining of sufficient welding pressure for an exact time without the pressing cycle being altered with stoppages in order to carry out said weld and the automatic placing of the parts to be welded onto the sheet or plate that is being pressed or deep drawn.

In effect the device forms a welding assembly together with another electrode holding the parts to be welded and that allows the circulation of the welding current through it. Each one of the electrodes is fixed in one of the dies or die holders that face each other in the press.

The device is made up of a base body that is fixed to the die or die holder; said body has one or several parallel columns, even though in principle the case put forward has two columns, the electrode being movable on one of the said columns and the intermediate coupling element of the positioning device being on the other. Said electrode is forced by means of a rear expanding element, such as a spring or gas cylinder. The point of the electrode is housed on the inside of a ceramic positioning body with a floatingly supported on the other column. At the end of this body there is the small part to be welded (for example a bolt) held in place for the welding and facing a lower window. When the machine descends the positioning device makes contact with the lower part (for example a sheet onto which the nut is to be fitted) compressing it against the lower electrode. Said positioning device places the window by which the nut or the part to be welded will exit directly onto the surface of the lower part in its correct position. The continuation of the compression makes the point of the electrode advance through the body that holds the nut, approaching towards the nut and supported in the stated rear expansion element. When the advance of the press compresses the electrode against the nut or the part to be welded it moves it from its position against the lower sheet and said expansion element applies sufficient pressure between the parts to be welded in order to make the weld by the passing of the current. When the press withdraws, the electrode is withdrawn first and subsequently the positioning device, the two parts (sheet and nut) being duly welded and joined.

This device is designed to make the weld in a very short period of time; correspondingly the electrode is pressed against the part with enough force according to the measurement of the rear expansion element. In order to do this it has been arranged so that the welding current supply element works at high intensity and high frequency.

The electrode has a base with a through opening over the column onto which it is arranged. Between the opening or housing for the electrode guide and the column there is a sliding insulating shield, for example made from a ceramic material or something similar. Said electrode has the corresponding electrical connecting cable at its rear end and on the front a rod corresponding to the internal part of same, which makes contact with the part to be welded and with the rear expansion element. The electrode body is cooled by water through an internal channel. In turn, the axial rod is by preference cooled by air through some openings or grooves around which forced air can be circulated, for example, for the purpose of avoiding the spilling of liquids onto the die. It has also been provisioned for the case in which under extreme use where a lot of heat is produced in the electrode that all the cooling is carried out by liquid, be it with water or suitable cooling liquids. The rod is connected to the electrode body in a permanent or in a movable manner, either by a Morse taper, a cylindrical anchorage or some other similar means of assembly.

The positioning device fulfils two basic approaches, it must locate the small part in the appropriate place for the welding and it must house the sliding electrode rod. Taking into account that said electrode obviously heats up, this positioning device is manufactured from a material that is resistant to the temperature and moreover has electrical insulation around the electrode, such as a ceramic material or similar. On the bottom part of the positioning device there is an exit window for the small part to be welded, and this must have suitable dimensions. On one side there is a window that connects to a conduit through which the parts are fed automatically, with a front sensor that will determine when the part has been placed in its position in order to start the welding process or the lowering of the press. The part is held until the electrode rod pushes it towards the distal window by means of some lateral clamps or a similar system.

The connection of the positioning device on the column on which it moves is carried out by means of an intermediate coupling part. Said part is also used for support at the entrance of the part supply conduit and the automatic regulator for the entry. Between this coupling part and the column there is an expansion element that determines the pressure to detach the body of the upper part respectively. The column has a hollow interior in which there is a spring or an opposing expansion cylinder in the core of the coupling part. In turn, the coupling part has a pivot, or support limiting the travel, housed in a side groove of the column for the purpose of preventing turning and limiting the maximum travel. It has been provisioned that between the column and the coupling part there is a casing or insulating and anti-friction element.

The entire assembly is fixed to the die by means of a system of fast connections, such as with some clamps or similar that are easily dismantled.

As the device is envisaged to be used in a completely automatic manner and without assistance it can have several sensors, such as the stated sensor for the presence of the small part to be welded on the inside of the positioning device, or the automated device for the supply of the parts at the entry of the conduit, amongst others.

In order to complete the description that is going to be made next and for the purpose of making the characteristics easier to understand, attached to this present document is a set of drawings in which, by way of being illustrative but not limiting, the most significant details of the invention have been represented.

DESCRIPTION OF A PREFERRED EMBODIMENT

In view of the figures commented on, and according to the numbering adopted, a preferred embodiment of the invention can be seen in same that is not by way of limitation. These consist of a support body (1) with two parallel columns (3 and 4), between which there is an expansion element (11) arranged in parallel. This body (1) has a receiving plate (2) at its rear and on both sides some bevelling for the fixing by means of clamps (24) or similar. On the column (3) there is an electrode (5 and 6) that is made up of a body (5) with a fixing opening with a movable insulated casing (10). The body (5) of the electrode has an anchoring (9) at one end to the connection cable to the electrical welding energy supply (not shown) and at the other end a rod (6) lowering by pressure. On the inside of the electrode body (5) there is a circuit (7) for the passage of the cooling liquid with its corresponding entrance (8) and exit. In turn the rod (6) has a series of openings and grooves (29) for the passage of cooling air. Said rod (6) is arranged coaxially with the expansion element (11) in the support body (1) and partially housed in the internal axial opening (13) of the positioning device (12). On the other column (4) there is an intermediary coupling part (19). At the end of said column (4) there is a blind opening (30), in which there is a spring (25) or an expansion element forced against said coupling part (19). In turn, on the side of the column (4) there is a groove (26) for the movement of a pivot (27) present on the coupling part (19), suitable to set the limit of the movement relative to each other. This moving part (19) has a rapid fixing pin (23) on the side of the bolt supply conduit (18) in its housing and at the front a housing space for the positioning device (12). Said positioning device (12) is in turn fixed by means of a second pin (22). The coupling part (19) has a moving casing (20) for fixing to the column (14).

Figure 1:
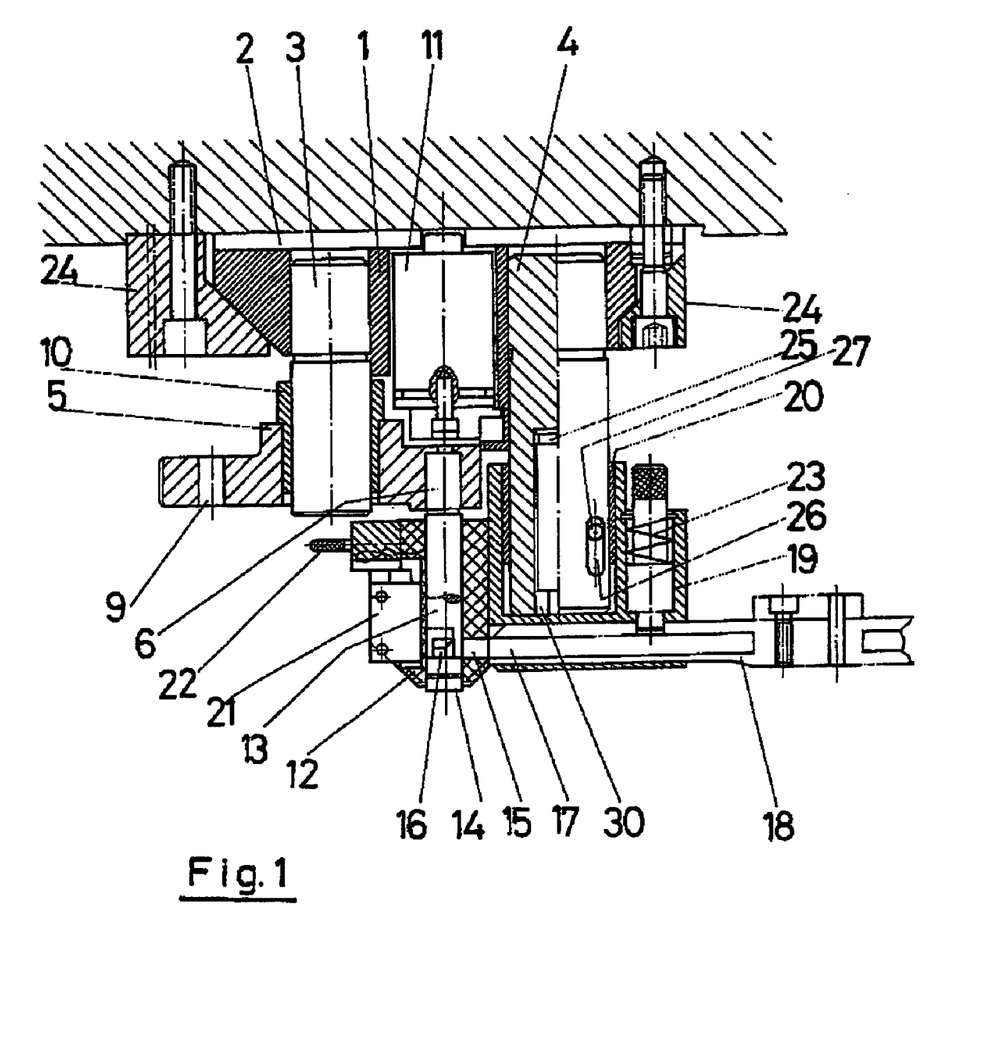
FIG. 1 Shows a partially sectioned elevation view of the device.
Figure 2:
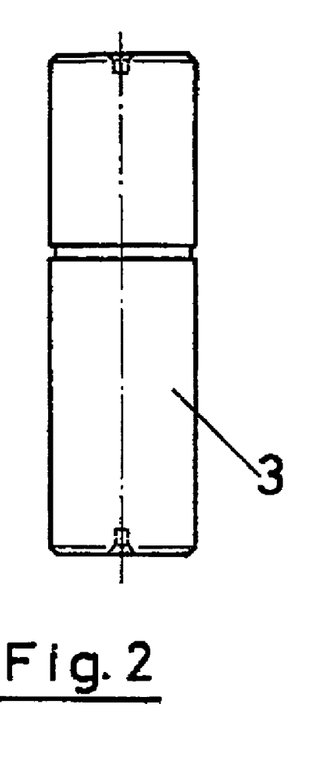
FIG. 2 Shows an elevation view of the electrode support column.
Figure 3:
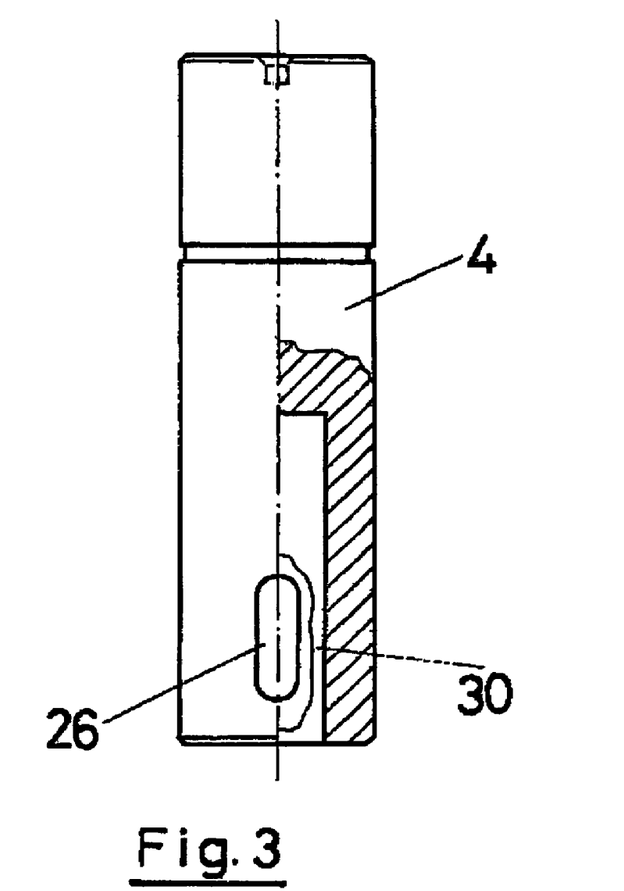
FIG. 3 Shows a semi-sectioned elevation view of the column that supports the intermediary coupling part.
Figure 4:
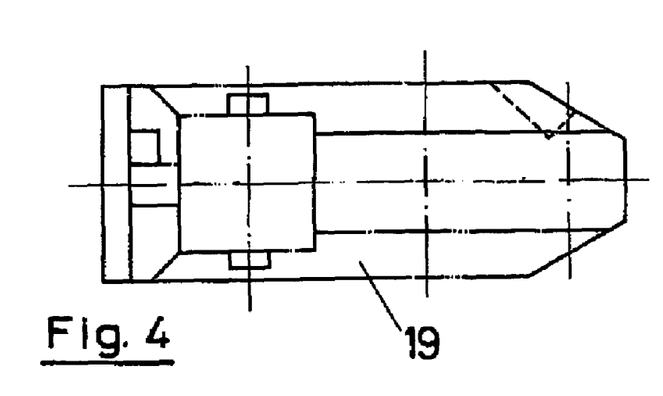
FIG. 4 Shows a lower view of the intermediary coupling part.
Figure 5:
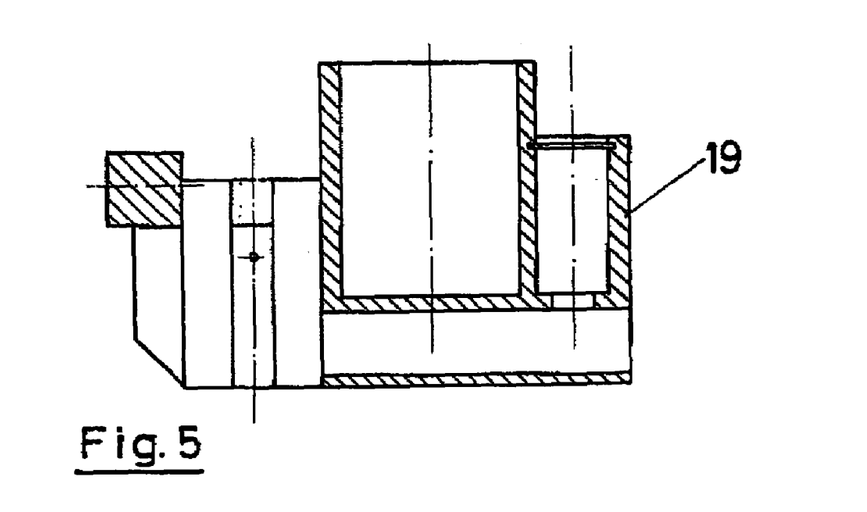
FIG. 5. Shows a sectioned elevation view of the intermediary coupling part.
Figure 6:
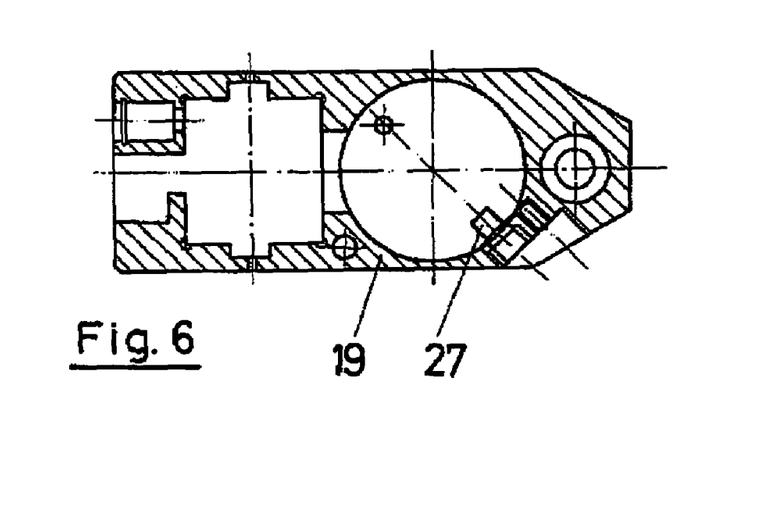
FIG. 6. Shows a transversally sectioned elevation view of the intermediary coupling part.
Figure 7:
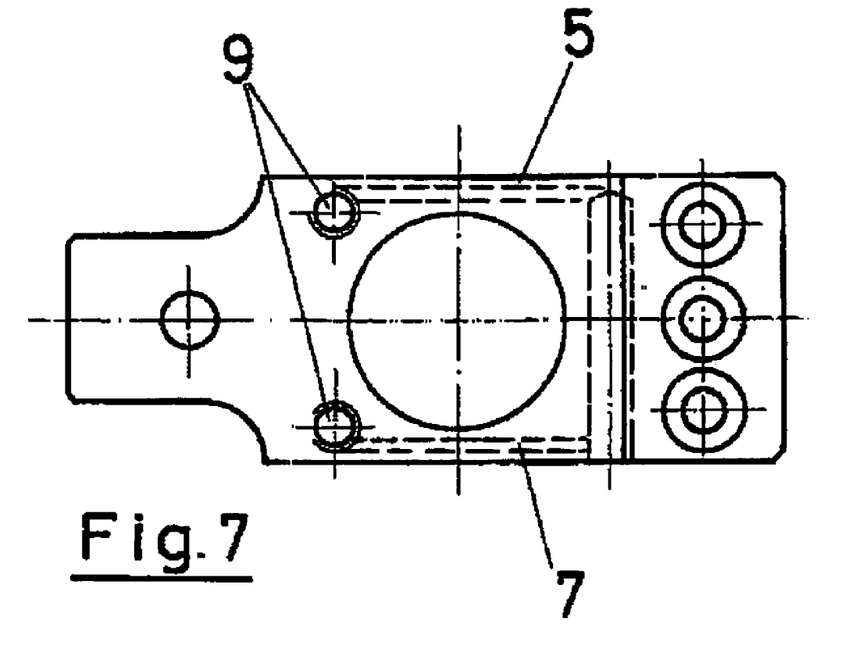
FIG. 7 Shows a plan view of the electrode body.
Figure 8:
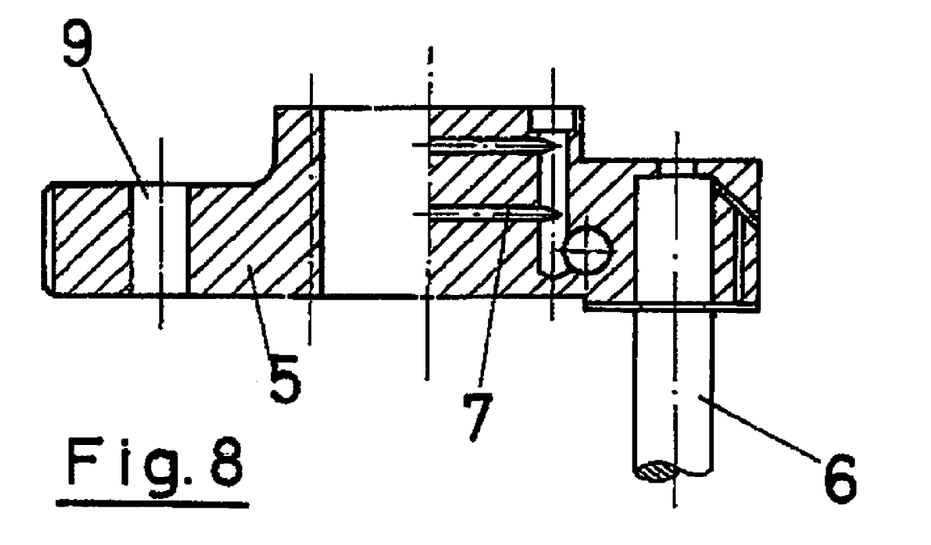
FIG. 8. Shows a sectioned elevation view of the electrode body.
Figure 9:
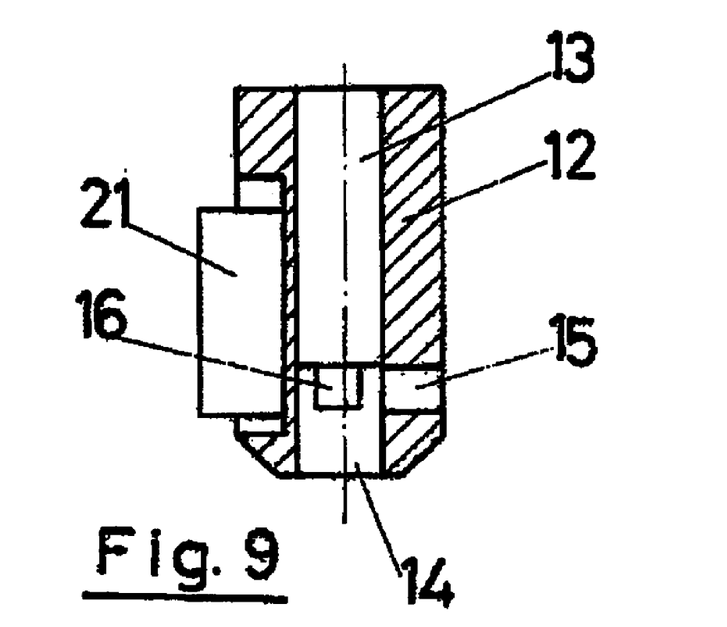
FIG. 9. Shows a sectioned elevation view of the positioning device.
Figure 10:
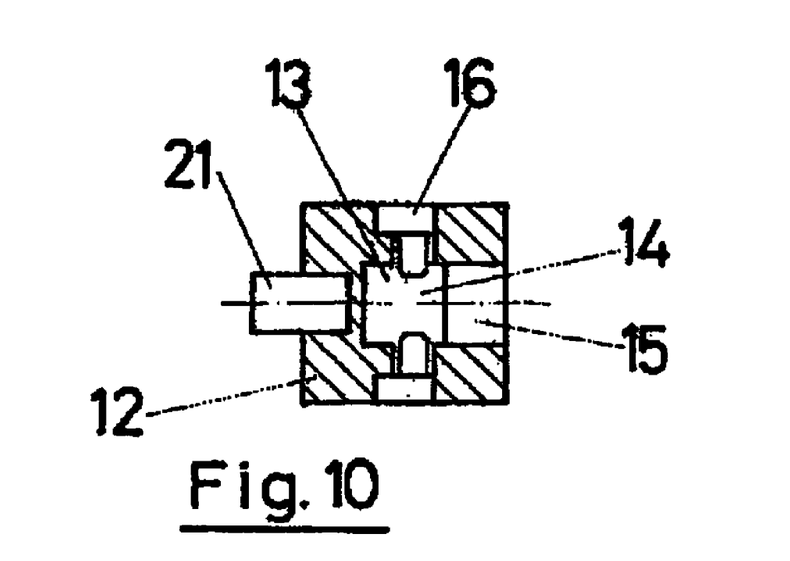
FIG. 10 Shows a transversal sectioned view of the positioning device.
Figure 11:
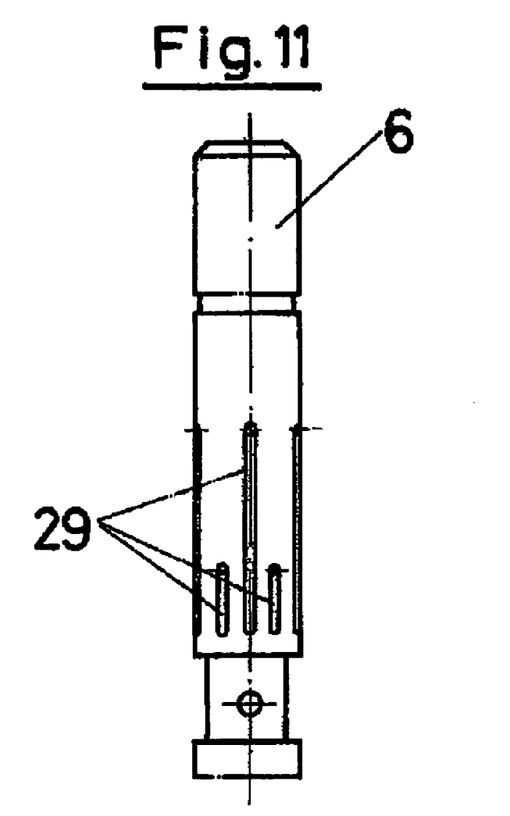
FIG. 11 Shows an elevation view of the electrode rod.
Figure 12:
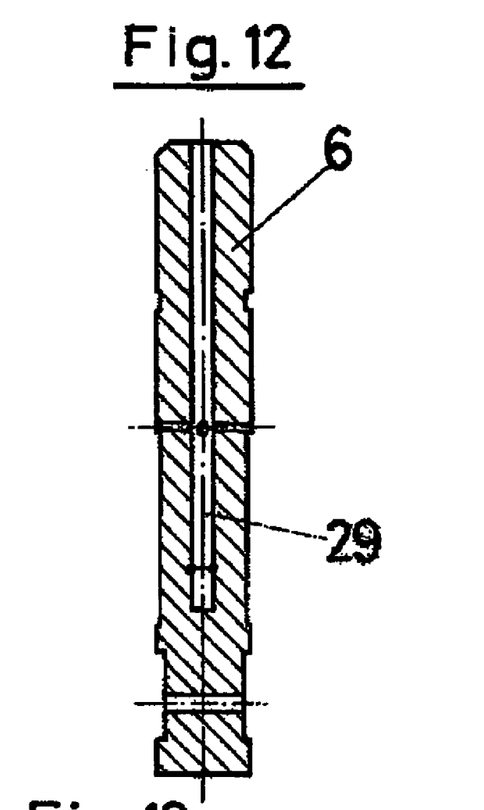
FIG. 12. Shows a sectioned elevation view of the electrode rod, showing the channels for the passage of air.
Figure 13:
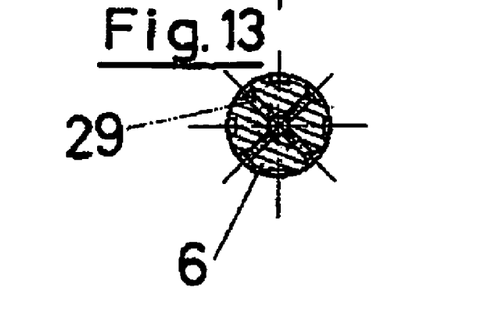
FIG. 13. Shows a transversal sectioned view of the electrode rod, showing the channels for the passage of air.
Figure 14:
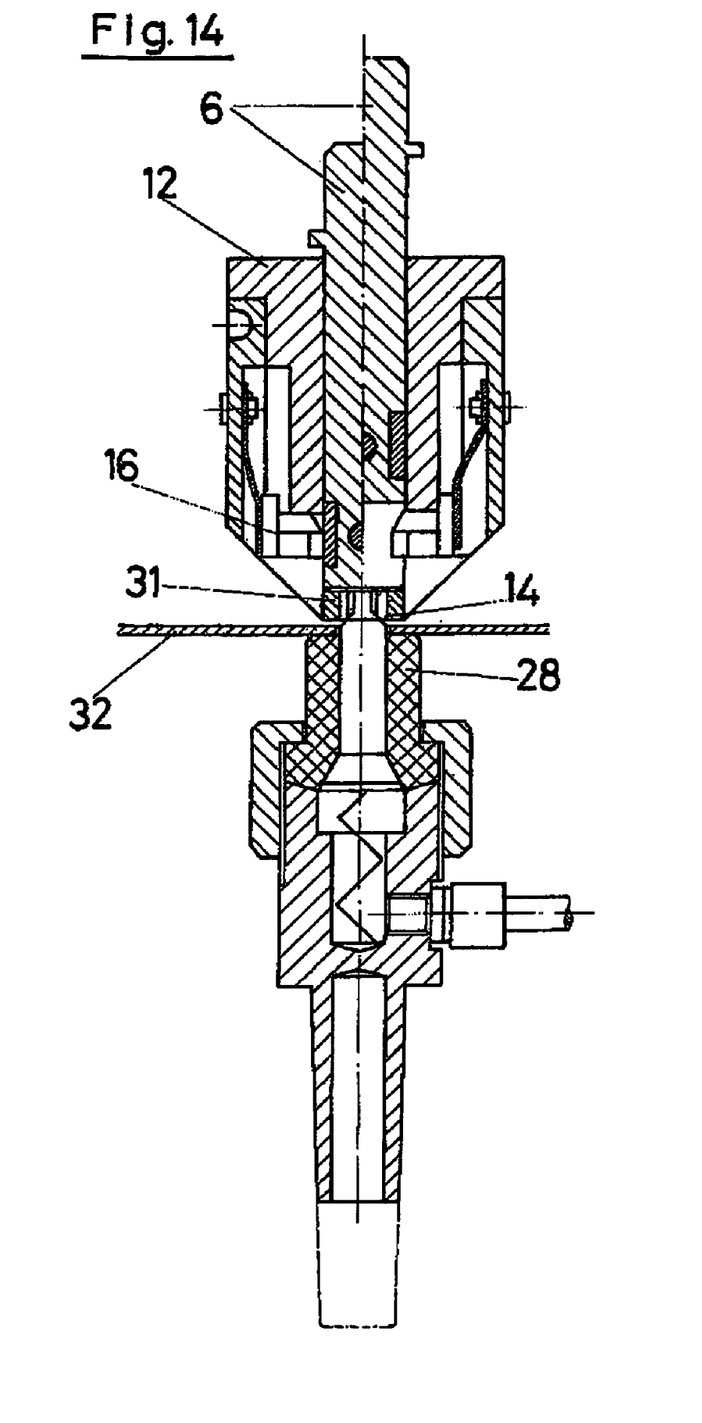
FIG. 14. Shows a semi-sectioned view of a detail of welding with the part to be welded pressed by the rod against the sheet to be welded and in a slightly forward position.

The positioning element (12) has an internal axial opening (13) in which the electrode rod (6) is housed and into which the small part (31) to be welded is received from a side window (15) inserted into the passage (17) of the conduit (18). On both sides of the axial opening (13) of the positioning device (12), and at the entrance of the window (15) of the conduit (18) there are some windows in which there are two fixing clamps (16) protruding from the small part (31) when it enters from said conduit (18). The axial opening (13) has an exit window (14) for the small part (31) to be welded at its lower end that is pushed by the electrode rod (6) against the sheet to be joined (32), together with the lower electrode (28). On one side of the positioning part. (12), the coupling part (19) has an associated sensor (21) fitted to detect the presence of the part (31) for automation purposes.

The invention claimed is:

1. A device for welding by resistance, comprising:
a body base from which extend one or more parallel columns, there being an electrode on at least one of the columns with one pole connected to a welding electric current generator and on at least one column a positioning device for a part to be welded, wherein the electrode is introduced in said positioning device for the compression of said part to be welded onto a second part to be welded against a second electrode;
a spring or expansion element in a rear position to the electrode and coaxial with the axis of movement of the electrode, the spring to exercise the compression force in the welding; and
an intermediary coupling part between the positioning device and the column on which it is positioned.

2. The device according to claim 1, wherein the electrode includes a body with a through hole or housing to guide the column in a sliding manner;
wherein the body includes an internal channel corresponding to a cooling liquid circuit with its corresponding inlet and outlet; and
wherein the electrode body has a rod partially introduced into the positioning device and coaxially arranged with the expansion element, operationally suitable for penetration.

3. The device according to claim 1, wherein the electrode rod includes openings or grooves for air cooling.

4. The device according to claim 1, wherein cooling of the rod is by liquid.

5. The device according to claim 1, wherein:
the positioning device comprises an axial opening for the passage of the rod, having a lower window for the placement of the part to be welded and a side window for the entry of the part to be welded, going into the inlet of an automatic supply channel;
the positioning device comprises on both sides of the axial opening respective fixing clamps for the part to be welded; and
the positioning device comprises a sensor adjacent to one of its walls to detect the presence of the part to be welded into the correct position on the inside of the axial opening.

6. The device according to claim 5, wherein the axial opening for the passage comprises a guide for the movement of the rod.

7. The device according to claim 1, wherein the positioning device is made from a material for insulation from the electrical current and is heat resistant.

8. The device according to claim 1, wherein the intermediary coupling part comprises an opening in the column through which it is movable; and wherein the column comprises an internal blind opening at its free end, said opening having on the inside an expansion element facing the coupling part for its separation; and wherein the column has, on one side of its contour, a longitudinal groove a limiting pivot slide on the intermediary coupling part to determine the maximum travel of the movement; and wherein the intermediary coupling part comprises a moving casing around the column.

9. The device according to claim 1, wherein the intermediary coupling part comprises a housing for supply conduit of the parts to be welded on the inside of the positioning device; and wherein the entry of the conduit is facing a side window of the axial opening of the positioning device; and wherein the intermediary coupling part comprises a fixing peg for said conduit.

10. The device according to claim 1, wherein the intermediary coupling part comprises a peg for the positioning device for its rapid removal.

11. The device according to claim 1, wherein the body comprises a coupling to fix to the die or die holder or tool onto which the device is fitted; and wherein the body base comprises a strengthening sheet at its rear in contact with the surface onto which it is attached, to take the forces of compression during the welding.

12. The device of claim 8 wherein the expansion element comprises a spring.

13. The device of claim 8 wherein the expansion element comprises a gas cylinder.

14. The device according to claim 1, wherein the body is shaped to fix to the die or die holder or tool onto which the device is fitted; and wherein the body base comprises a strengthening sheet at its rear in contact with the surface onto which it is attached, to take the forces of compression during the welding.

* * * * *